United States Patent [19]
Szymborski et al.

[11] Patent Number: 5,121,342
[45] Date of Patent: Jun. 9, 1992

[54] APPARATUS FOR ANALYZING COMMUNICATION NETWORKS

[75] Inventors: Robert C. Szymborski, Bloomington; Kenneth D. Gjerde, Jr., Minneapolis; Jeffrey D. Mullin, Roseville; Shawn P. Finnegan, Mendota Heights; Tracy Clark, Bloomington; Lonnie J. Helgeson, Jordan, all of Minn.

[73] Assignee: Network Communications Corporation, Minneapolis, Minn.

[21] Appl. No.: 399,743

[22] Filed: Aug. 28, 1989

[51] Int. Cl.[5] ............................................. G06F 15/16
[52] U.S. Cl. ................................ 364/514; 364/551.01; 375/10
[58] Field of Search ............... 364/514, 551.01, 927, 364/927.8; 340/825.06, 825.07; 371/20.1, 20.4; 375/10

[56] References Cited

U.S. PATENT DOCUMENTS

| | | | |
|---|---|---|---|
| 3,956,601 | 5/1976 | Harris et al. | 371/20.4 |
| 4,055,808 | 10/1977 | Holsinger et al. | 375/f10 |
| 4,545,011 | 10/1985 | Lyon et al. | 371/20.1 |
| 4,750,175 | 6/1988 | Brenneman et al. | 371/20.1 |
| 4,802,162 | 1/1989 | Kakuda et al. | 364/900 |

*Primary Examiner*—Parshotam S. Lall
*Assistant Examiner*—Ellis B. Ramirez
*Attorney, Agent, or Firm*—Dorsey and Whitney

[57] ABSTRACT

A handheld, battery operated network testing device uses disk loaded software, programmable gate arrays, and digital signal processing to selectively configure the device for a full range of analog and digital testing modes in a variety of communications protocols, including T-1 full duplex drop and insert. A 25 by 80 column LCD display provides for a full scale video output, and a unique, power efficient, electroluminescent backlight circuit provides for viewing of the display in poorly lit environments.

2 Claims, 14 Drawing Sheets

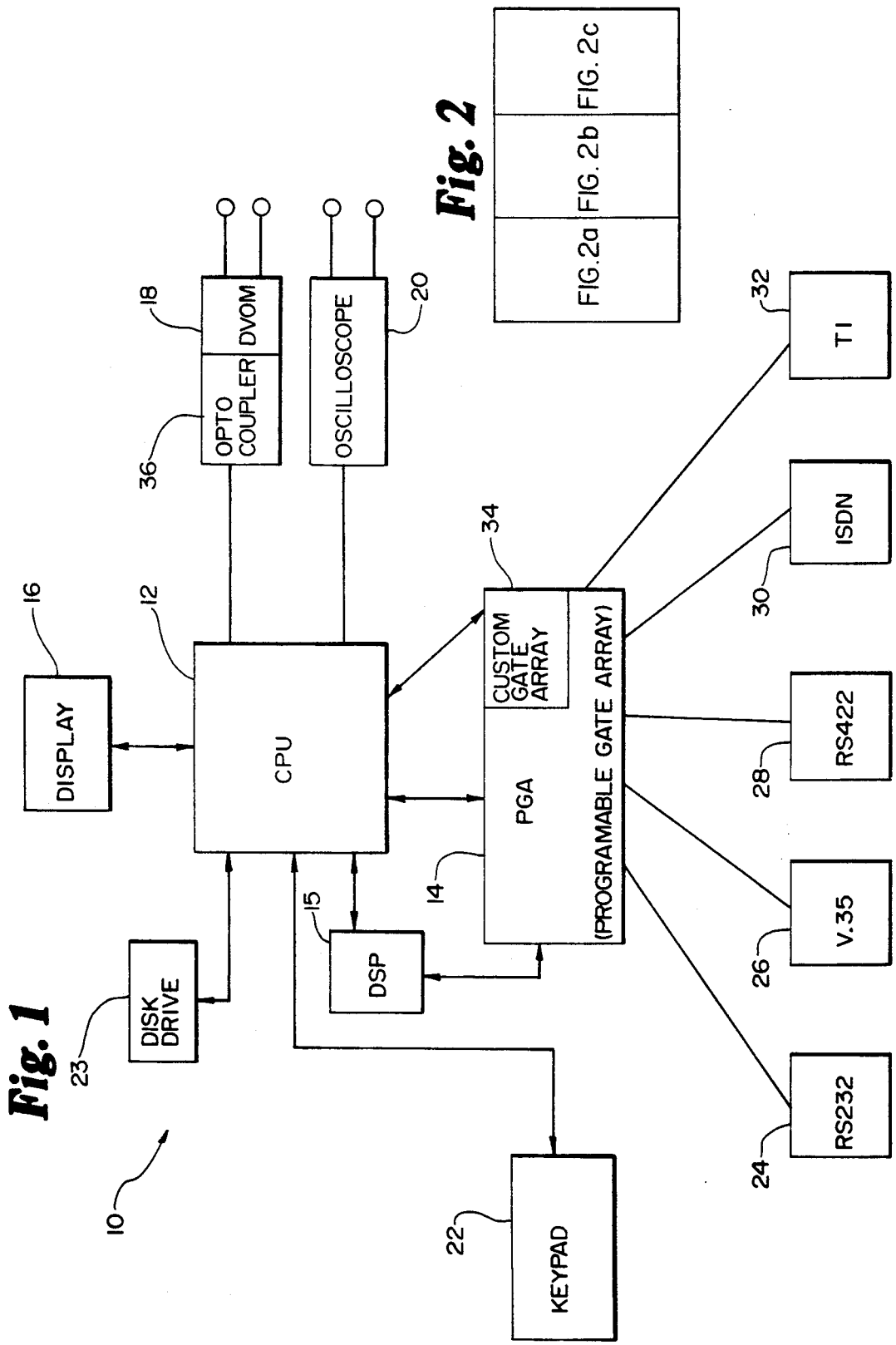

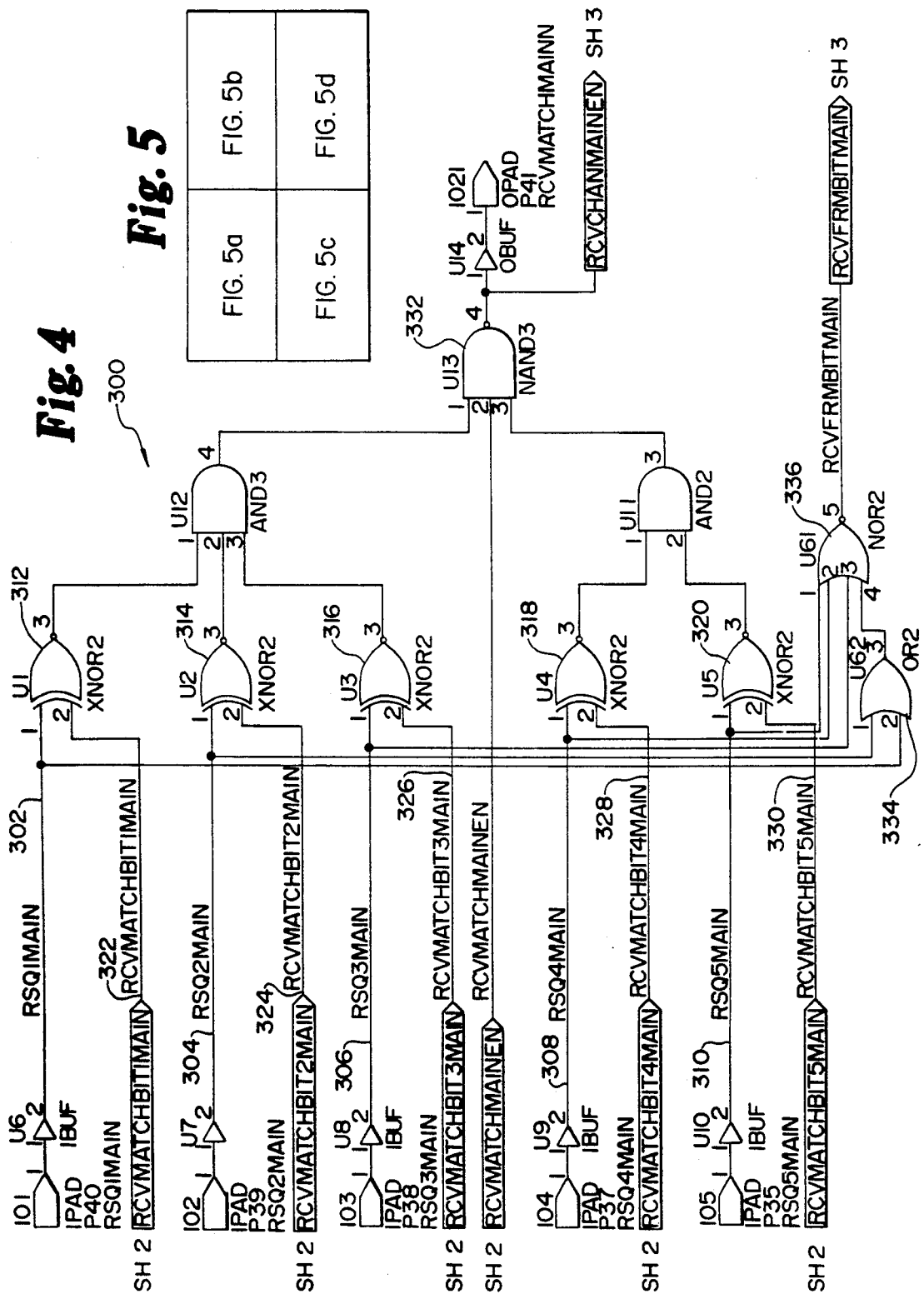

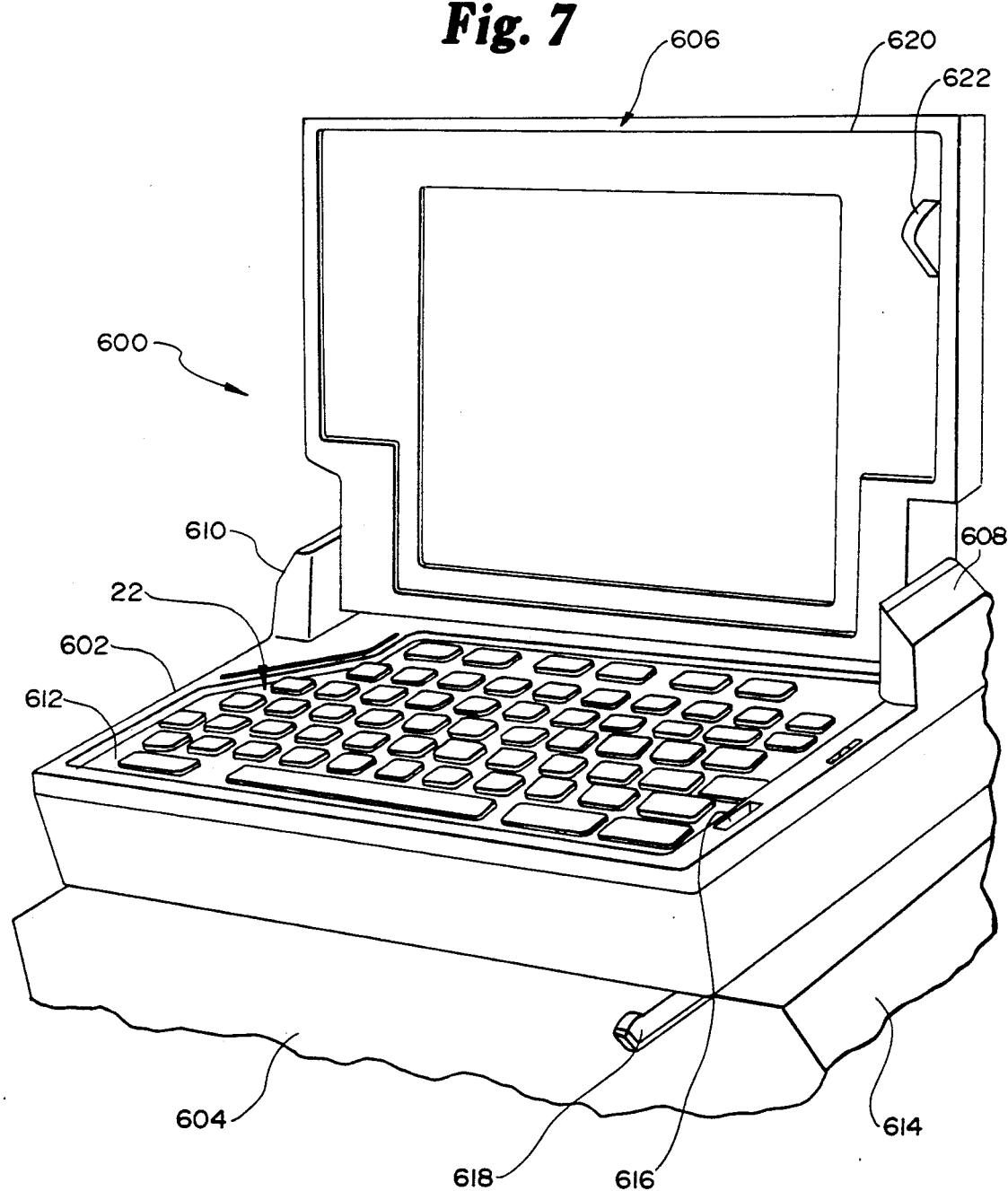

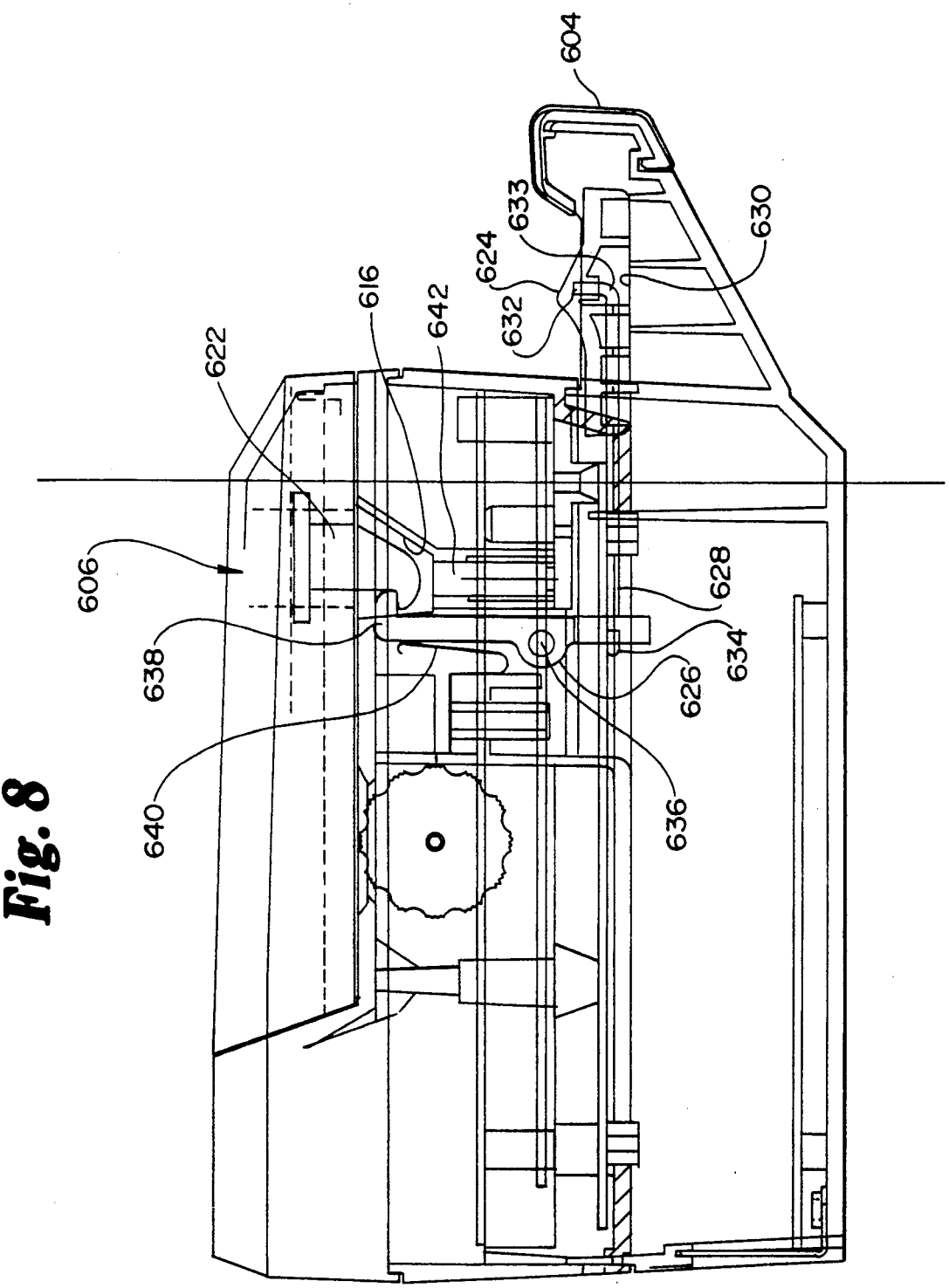

APPARATUS FOR ANALYZING COMMUNICATION NETWORKS

TECHNICAL FIELD

This invention pertains to electronic test equipment for analyzing data and telecommunication networks and computers under varied protocols, code sets, and environments. In particular, it pertains to a portable, multi-purpose, network testing device that combines a full range of T-1, 2.048 megabit, and other similar high speed transmission line testing capabilities, analog testing capabilities, and a variety of non-T-1 digital transmission, signalling and supervision, and protocol testing capabilities into a single, integrated testing unit.

BACKGROUND ART

Both individuals and organizations are highly dependent on communication networks. The telephone system, automated bank tellers, airline reservation systems, and office information handling systems are examples of communication networks that affect each of our lives on a daily basis. The usefulness of such networks is directly related to their availability, on a moment's notice, for the reliable communication of information.

A single communication network typically includes a variety of transmission media that require both the analog and digital modulation of information. Maintaining the availability of a communication network, accordingly, requires a wide variety of electronic test equipment, and trained technicians with a broad scope of electronic skills. In particular, maintenance of modern communication networks requires equipment and personnel capable of performing protocol testing, digital transmission testing, signalling and supervision testing, and analog transmission testing.

The T-1 transmission line is the most widely employed transmission link used to connect the various nodes and terminals of integrated voice/data communication networks. The capability to test and diagnose T-1 carrier facilities is therefore a required element of a comprehensive testing program for most voice/data communication networks.

Test equipment for monitoring individual characteristics of communication networks are known. For example, Bit Error Rate (BERT) and Block Error Rate (BLERT) testers are commercially available, as are analog test sets. Sophisticated devices such as the 6640/6640D Network Probe TM test set, manufactured by Network Communications Corporation, 10120 West 76th Street, Eden Prairie, Minn., are based upon microcomputer technology and provide the capability for complete network testing within a single package.

None of the available communication network test equipment, however, has combined, in a single, compact, and portable piece of test equipment, the capability of performing a full range of T-1 tests in combination with the capability of performing non-T-1 protocol testing, digital transmission, signalling and supervision testing, and analog transmission testing. Moreover, none of the existing test equipment has successfully incorporated a full range of hardware and protocol interfaces (such as RS-232, RS-422, V.35, ISDN, etc.) into a single, compact unit. None of the available portable equipment has had the speed to perform full duplex drop and insert on a T-1 line. Finally, none of the available equipment has incorporated a dual channel oscilloscope, a required piece of equipment for analyzing analog performance characteristics, into the same display used for non-analog output display.

A truly portable, battery operated piece of test equipment for analyzing communication networks that was adaptable to a wide variety of equipment interfaces, that had the speed and capability for performing a full range of T-1 line testing (including full duplex drop and insert), that incorporated a full range of analog testing capability (including a dual channel oscilloscope) and that included a full range of non-T-1 digital transmission, signalling and supervision, and protocol testing capabilities into a portable integrated unit, would be a decided improvement over existing test equipment.

SUMMARY OF THE INVENTION

The problems of the prior art, as addressed above, are in large measure solved by the present invention. The network testing device disclosed herein provides a full range of analog, T-1, and non-T-1 testing capabilities in a compact, battery operated, portable piece of test equipment.

The network testing device hereof uses disk loaded software and programmable gate arrays to selectively configure the device for a plurality of different testing modes in a variety of communications protocols. A central processor, together with the processing speed provided by an auxiliary digital signal processor, DRAM memory bank, and the programmable gate arrays, provide the network testing device with the ability to perform a full range of T-1 line tests, including full duplex drop and insert.

The testing device's unique circuitry is specifically designed to provide for packaging of a high powered versatile piece of test equipment into a compact, hand held unit. Compactness is achieved through the use of the programmable gate arrays, a custom gate array that provides the device with a bank of high speed counters, and interchangeable, disk loaded software that allows the single processor to selectively adapt to a wide variety of standard interface protocols.

A unique, battery operated, power efficient circuit drives an electro-luminescent capacitor for backlighting of an expanded 25 by 80 column LCD display in poorly lit environments. The display is pivotally coupled by a specially designed hinge and lock assembly to the body of the hand held instrument case.

BRIEF DESCRIPTION OF THE DRAWINGS

FIG. 1 is a generalized block diagram of the network testing device in accordance with the present invention;

FIG. 4 is a logic diagram depicting in detail the T-1 channel select capability of the present invention;

FIG. 7 is a perspective view of the hand held instrument case for the testing device, with the pivotal display in its upright position;

FIG. 8 is a side elevational, sectional view of the case depicted in FIG. 7 with the display in its stowed position.

DETAILED DESCRIPTION OF THE DRAWINGS

Figure 2A:
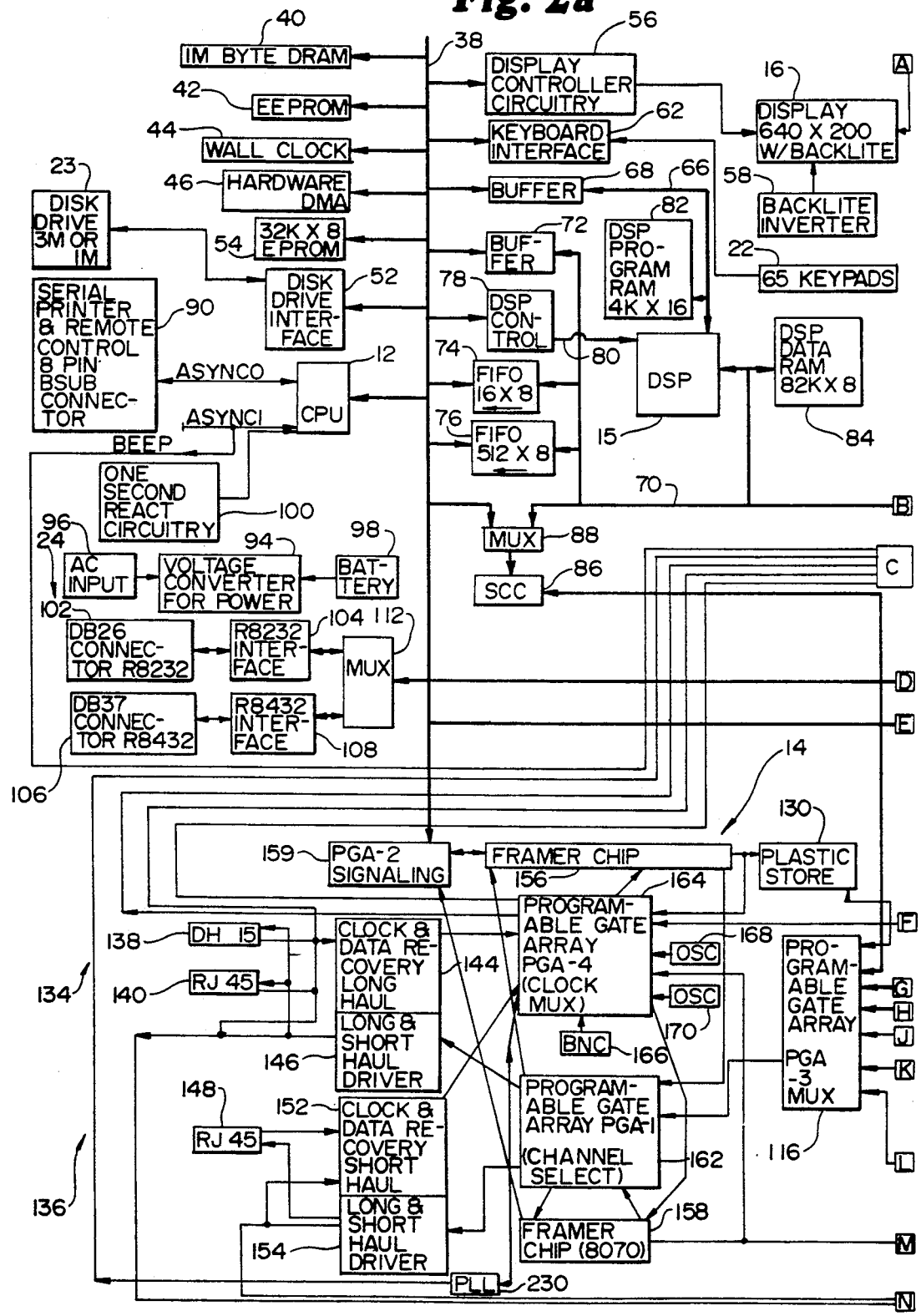
FIG. 2 is a detailed block diagram of the network testing device in accordance with the present invention.

Referring to the drawings, the network testing device 10 in accordance with the present invention broadly includes a central processing unit (CPU) 12, a bank of programmable gate arrays 14, digital signal processor (DSP) 15, display 16, digital volt meter (DVOM) 18, oscilloscope 20, key pad interface 22, disk drive interface 23, and a variety of hardware interfaces 24, 26, 28, 30, 32.

The CPU 12 is a 64180 ten megahertz chip available from either the Hitachi America Ltd., 50 Prospect Avenue, Tarrytown, N.Y. 10591, or Zilog Inc., 210 Hacienda Avenue, Campbell, Calif. 95008. The CPU 12 primarily functions as a user interface processor, with direct links to the input key pad 22, disk drive 23 and the output display 16. The CPU 12 also provides for overall control and coordination of the device 10. DSP 15 is a DSP 16 chip available from AT&T. The DSP provides the system 10 with a high speed number processing capability.

The bank of gate arrays 14 includes several programmable gate arrays comprising the 2018 or 3030 programmable gate array 2000 or 3000 series chip available from Xilinx Inc., 2069 Hamilton Avenue, San Jose, Calif. 95125, or Advanced Micro Devices, Inc., 901 Thompson Pl., Sunnyvale, Calif. 94086. The programmable gate arrays are RAM based logic cells that can be reconfigured on the fly. Also included in the bank of gate arrays is a custom gate array 34, having fixed, rather than programmable, gates. The custom gate array 34 is primarily made up of 24 high speed counters including 24 bit and 16 bit counters. The counters are used to tally CRC errors, framing errors, multiframe errors, number of frames received, BPV errors, excess zeros and ones density, bit errors received, bit errors injected, and bits received. The counters also keep track of clock displacement, clock slip, and error inject rate. The custom gate array 34 also includes several time bases, each of which are adjustable, used throughout the system 10 including the sweep clock for the oscilloscope 20, and also includes logic for the system's bit error rate tester (BERT).

The key pad 22 is a basic 65 key, ASCII character set keyboard providing for operator input into the system 10. The disk drive 23 can be either a 1 meg. or 2 meg. standard disk drive for reading a 3½" floppy disk.

The oscilloscope 20 is a twenty megahertz sampling digital storage scope that has a seven megahertz input bandwidth. The digital volt ohm meter (DVOM) 18 is isolated from the CPU 12 and the rest of the system 10 by optocouplers 36.

Hardware interfaces, 24, 26, 28, 30, 32 provide for connection of the system 10 to data terminal equipment (DTE) and data communication equipment (DCE) through a variety of standard serial binary data interchange protocols. The ISDN interface 30 provides for the S, the T, and the U interface. The T-1 interface 32 includes a 1.544 megahertz interface with 100 ohm or greater than 1000 ohm termination, and a 2.048 megahertz interface with 75 ohm or greater than 1000 ohm balanced termination mode, and 120 ohm unbalanced termination.

Figure 2B:
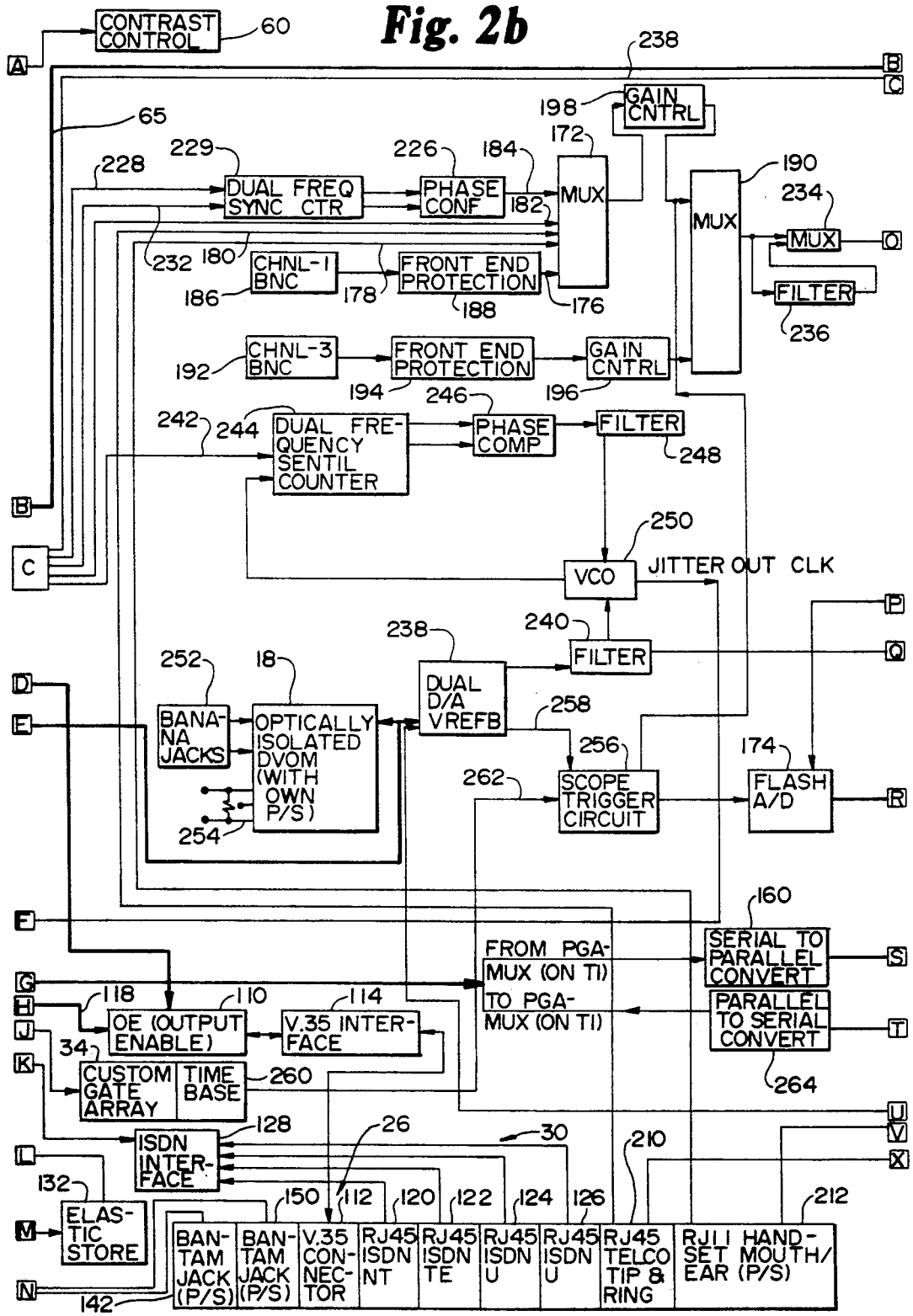
Figure 2C:
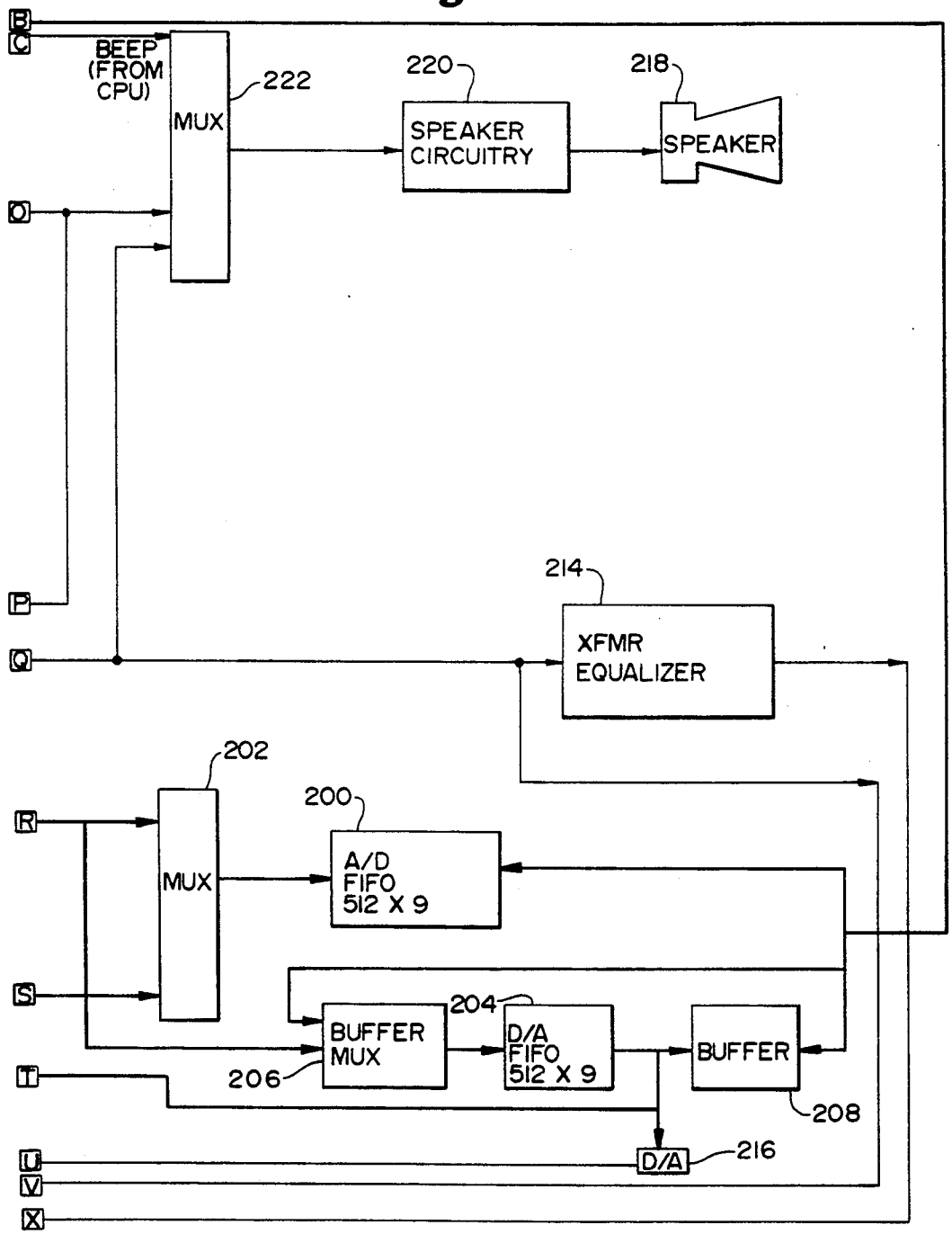

FIG. 2 is a detailed block diagram of the network testing device 10. Referring to the upper left hand portion of FIG. 2, CPU bus 38 interconnects CPU 12 with a variety of support circuits as described below.

Starting from the top of CPU bus 38, as depicted in FIG. 2, a standard one megabyte by eight, 120 nanosecond DRAM and a serial EEPROM 42 are connected to the bus 38. The EEPROM 42 stores calibration values that are used to support primarily the analog functions of the system 10. The EEPROM 42 can also be used to store an identifying serial number for each unit 10, and also stores disk drive interface information.

Wall clock 44 is a standard chronometer which keeps track of month, time of day, elapsed time, and similar chronometric data used for display purposes. Hardware DMA 46 provides the system 10 with a faster DMA capability than is provided by the two DMAs included onboard the CPU 12.

Disk drive 23 and disk drive interface 52 provides the system 10 with the ability to be programmed from a standard 3½ inch floppy disk, allowing the system 10 to function in a variety of different programmed modes. 32k×8 EPROM 54 is used primarily to boot up the system 10 by reading the disk loaded into the disk drive 23 and storing the program in DRAM 40. EPROM 54 is also used to store basic diagnostic and memory tests.

Display 16 is connected to CPU bus 38 via display controller circuitry 56. The display 16 is a 640 by 200 pixel, 25 by 80 column LCD display available from Panasonic Company, One Panasonic Way, Secaucus, N.J. 07094, 201/348-7000. Back-light converter 58, described in detail below in conjunction with FIG. 5 provides display 16 with a backlight capability for viewing in a poorly lit environment. Contrast control circuit 60 provides for adjustment of the contrast of the display 16.

Display controller circuitry 56 includes a graphics display RAM, a character RAM, a video RAM, and an attributes RAM. The graphics RAM controls the display 16 for presentation of bit mapped oriented display information used with the oscilloscope and other analog input information. The video RAM and character RAM drive the display for presentation of alphanumeric characters. The attributes RAM provides the display 56 with blanking, low intensity, cursor, and other similar type functions.

The 65 key pad 22 is connected to CPU bus 38 via standard keyboard ASCII interface 62.

The system 10 includes the digital signal processor (DSP) 15 to provide for high speed processing of numerical algorithms. The DSP 15 is coupled to the CPU 12 via DSP RAM access bus 66 through buffer 68, and via DSP data bus 70 through buffer 72 and FIFOs 74, 76. The DSP 15 is further coupled to the CPU 12 via control bus 80 through DSP controller 78. The high speed processing capability of the DSP 15 is used for a variety of tasks including protocol analysis, PCM companding routines, and DTMF generation and decoding. The DSP 16 is integral to the jitter analysis capability of the system 10. A fast fourier transform algorithm is performed by the DSP for spectrum analysis jitter testing, a band pass filter algorithm is executed by the DSP for wide band jitter analysis, and sine, square, or sawtooth jitter waveforms can be generated by the DSP for jitter generation routines.

DSP RAM access bus 66 provides a path for the CPU to access the DSP RAMs when the DSP is reset (i.e., not operating), and provides access to CPU 12 for programming of the DSP program RAM 82 by the CPU 12. Buffer 68 provides for isolation of the CPU 12 and the DSP 15 while the DSP 15 is running.

Buffer 72 provides access by the CPU 12 to everything connected to the DSP data bus 70 when the DSP 15 is reset. Access to the DSP data bus 70 provides the CPU 12 with the ability to run diagnostics through the DSP data bus 70 on DSP related circuits.

The DSP control port 78 provides for interrupt control between the DSP 15 and the CPU 12, provides for turning the DSP 15 on and off by the CPU 12, and provides for operation of the DSP 15 in a low power state.

FIFOs 74, 76 allow for transfer of data and instructions between the DSP 15 and CPU 12, accommodating the different operating speeds of the CPU 12 and DSP 15 (approximately 800 nanoseconds per instruction for the CPU 12 vis-a-vis approximately 55 nanoseconds per instruction for the DSP 15), and provides the CPU 12 with the ability to send instructions to the DSP 15 without continuously interrupting the operation of the DSP 15.

DSP data RAM 84 is connected to DSP 15 by the DSP bus 70. The DSP data RAM 84 is a 32K×8 data RAM that provides a scratch pad area for use by DSP 15.

CPU bus 38 and DSP data bus 70 are each connected to Serial Communications Controller (SCC) 86 through multiplexer 88. The SCC 86 receives serial data from each of the various interfaces in their individual protocols (i.e., RS 232, RS 422, V.35, ISDN, or T-1) and converts the data into a format readable by the CPU 12 and DSP 15. The mux 88 allows for transfer of the preformatted data to either the CPU 12 or the DSP 15 for processing. Once the data is acknowledged by either the CPU 12 or DSP 15, it is transferred to the 512 by 8 byte FIFO 76 for DMA transfer to the one megabyte DRAM 40.

Connector 90 is a nine pin standard RS 232 interface that provides for asynchronous connection of the CPU 12 to either a serial printer (not shown), a remote control device (not shown), or a dumb terminal (not shown) for diagnostics. When connected to a printer, connector 90 provides for a hard copy output of the video image presented on display 16. When connected to a remote control device, the system 10 can be operated via land lines by a remotely stationed operator.

Voltage converter 94 provides operating power to the entire system 10. The voltage converter 94 can be powered either from AC input 96 or a battery 98. One second reset circuitry 100 provides a one second delay from the time the system is turned on to the time the power is applied to the CPU 12 to ensure stabilization of the power levels before applying power to the CPU 12.

The RS 232 interface 24 includes a 25 pin DB25 RS 232 connection 102 and interface 104 for converting between RS 232 and TTL levels. The RS 422 interface 28 includes a 37 pin DB37 connection 106 and interface 108 for converting between RS 422 and TTL levels. The RS 232 interface 104 and RS 422 interface 108 are individually, selectively connected to output enable switch 110 through mux 112.

V.35 interface 26 includes V.35 connector 112 and interface 114 for converting between V.35 and TTL levels. The interface 114 is connected to output enable switch 110. Output enable switch 110 is connected to programmable gate array 3 (PGA-3) 116 via bus 118. The operator of the system 10 can select between the V.35 interface 26, the RS 232 interface 24, or the RS 422 interface 28 through the appropriate configuration of mux 112 and output enable switch 110. ISDN interface 30 includes four standard RJ45 connectors 120, 122, 124, 126 for the S or T interface (NT/TE), and primary and secondary U interfaces, respectively. Each of the connectors 120, 122, 124, 126 are coupled to PGA-3 116 through interface circuitry 128 for conversion between ISDN and TTL levels.

Each of the RS 232, RS 422, V.35 and ISDN interfaces are coupled to the system 10 through PGA-3 116. The T-1 interface 32 is likewise, indirectly, coupled to PGA-3 116 through elastic store buffers 130, 132.

T-1 interface 32 includes a T-1 primary interface 134 and a T-1 secondary interface 136. The primary interface 134 is capable of receiving and transmitting long and short haul T-1 communications. The secondary T-1 interface 136 is capable of short haul receipt of T-1 communications, and long and short haul transmission of T-1 communications.

Primary T-1 interface 134 includes DB15 jack 138, RJ45 jack 140, and bantam jack 142, and long haul clock and data recovery circuit 144 and long and short haul driver 146. Secondary T-1 interface 136 includes RJ45 jack 148, bantam jack 150, short haul clock and data recovery circuit 152, and long and short haul driver 154.

The T-1 interface 132 also includes primary framer chip 156 and secondary framer chip 158. The primary and secondary framer chips comprise 8070 chips available from the Rockwell International Corp., 2230 East Imperial Highway, El Segundo, Calif. 90245, 213/647-5000. The primary and secondary framer chips 156, 158 provide T-1 synchronization information, bit stream location, and alignment errors for the primary and secondary T-1 interfaces 134, 136, respectively. The outputs of the framer chips 156, 158 are routed to elastic stores 130, 132, respectively to accommodate for variances in data rate and synchronization between input and output T-1 communications of the system 10. The framer chips 156, 158 are also connected to programmable gate array 2 (PGA-2) 159 for processing of alarm and signalling information.

PGA-3 116 is primarily a switching multiplexer for routing incoming and outgoing serial data streams 10 between the various hardware interfaces 24, 26, 28, 30, 32 and the CPU 12, DSP 15 and gate arrays.

Serial binary data presented to PGA-3 116 via either of the RS 232, V.35, RS 422, ISDN, or T-1 interfaces can be routed from the PGA-3 116 to the CPU 12 or DSP 15 via SCC 86. Alternatively, data can be routed by PGA-3 116 to the DSP 15 via serial to parallel converter 160, or can be routed to any of PGA-3 116, PGA-1 162, PGA-4 164, or the custom gate array 34 for processing. While it will be appreciated that each of the PGAs can be configured on the fly for a specific task, PGA-3 is primarily configured as a signal multiplexer for distribution of signals to and from the various interfaces.

PGA-4 is primarily configured to provide various clock signals throughout the system 10. For instance, the clock recovered from either the primary or secondary T-1 clock recovery circuit 144, 152, respectively, or a clock from an external BNC clock connector 166, or a clock from onboard 1.544 megahertz or 2.448 megahertz clocks 168, 170, or jittered clock provided from the output of VCO 250, can be distributed throughout the system 10. PGA-4 164 also accomplishes standard clock related functions such as B8ZS detection and one's density detection. PGA-4 164 also includes logic circuits for initiating and analyzing BERT testing. PGA-1 162 is primarily configured for T-1 channel selection, as described in detail below in conjunction with FIG. 3.

Analog signal multiplexer 172 selects from a variety of analog input signals for routing of the analog signals to flash A-D converter 174. The inputs to multiplexer 172 include oscilloscope input 176, telephone handset inputs 178, 180, primary T-1 input 182, and jitter in signal input 184.

The system 10 includes a dual channel oscilloscope capability. The first channel of the oscilloscope is input to the system 10 through oscilloscope input 176 to analog signal multiplexer 172 via BNC jack 186 and front end protection buffer 188. A second channel of the oscilloscope is injected into the system 10 through a second analog signal multiplexer 190 via channel 2 oscilloscope BNC jack 192, front end protection buffer 194, and gain control 196. The second input to multiplexer 190 is received from multiplexer 172 via gain control 198. When operating the system 10 in the dual channel oscilloscope mode, multiplexer 190 alternatively distributes the channel 1 oscilloscope signal and the channel 2 oscilloscope signal to the flash A-D converter 174. The digitized channel 1 oscilloscope signals are routed to FIFO buffer 200 via multiplexer 202, and the channel 2 oscilloscope digitized inputs are routed from the flash A-D converter 174 to FIFO buffer 204 through multiplexer 206. The digitized oscilloscope signals stored in FIFO 200 are directly accessible by DSP bus 70, and the channel 2 digitized oscilloscope signals are available to the DSP bus 70 through buffer 208. After appropriate processing by the DSP 15, which can include inversion of channel 2, addition, back weighting averaging, and expansion using linear and sine interpolation, the data is routed to CPU 12 and presented on display 16.

Inputs 178 and 180 to analog signal multiplexer 172 provide the system 10 with a four wire telephone line interface capability. Transformer equalizer provides for satisfactory coupling to the telephone lines through otherwise low performance (and therefore physically small) transformers. D-A converter 216, to be described more fully below, includes a tone generation capability for transmission over the telephone line interface. The tone generation capability allows the system 10 to transmit a tone, loop it back to its self, and analyze the bandwidth performance of a transmission line. The four wire telephone interface 178, 180 also allows the system 10 to receive or transmit telephone voice signals through a telephone handset, or through speaker 218 via speaker circuitry 220 and speaker multiplexer 222.

Input 182 to analog signal multiplexer 172 is taken from the T-1 primary side receive line for a measurement of the signal amplitude on the T-1 line. The T-1 signal is routed to the flash A-D converter 174, is digitized, and then routed to the DSP 15 for processing. The signal amplitude of the T-1 line can then be displayed as either a peak value or as an actual waveform on display 16.

Input 184 to analog signal multiplexer 172 is an analog measurement of the jitter between a recovered clock signal and a reference clock signal. The jitter measurement is accomplished by dual frequency synchronous counter 224 and phase comparator 226. The recovered clock signal is provided to the dual frequency synchronous counter 224 via line 228. The reference clock could be provided from one of several sources. For instance, the reference clock could be provided by one of the onboard oscillators 168, 170, or could be an external clock provided through BNC connector 166. The reference clock could also be a recovered clock signal stabilized by phase lock loop 230. The recovered clock to be compared to the referenced clock is provided to the dual frequency synchronous counter 224 via line 232. The measurement of phase difference between the recovered clock and the reference clock is routed by multiplexer 172 to flash A-D converter 174, and then on to the DSP 64 and CPU 12 for processing and display. Multiplexer 234 provides the capability of routing the measurement of jitter through capacitor filter 236 to permit measurement of jitter within the filtered ranges prescribed by either the AT&T or CCITT standards. The digitized measurement of jitter is routed from a flash A-D converter 174 through the buffer mux 206 into the FIFO 204. As will be recalled, the digitized output of the oscilloscope channel 2 is also route to FIFO 204. Buffer 208 provides coordination as to what type of data is presented from FIFO 204 to the DSP bus 70.

Multiplexer 222 selectively provides speaker 218 with either an audio warning signal provided on line 238 from the CPU 12, or audio signals routed from the analog signal multiplexer 172, or voice telephone signals provided through telephone jacks 210, 212.

D-A converter 216 receives digital data from DSP bus 70 through buffer mux 206 and FIFO 204. The D-A converter 216 converts the digital data to an analog signal and routes the analog data to dual D-A converter 238 for gain control. The data can then be routed from the dual D-A converter 238 through filter 240 and mux 222 to speaker 218.

The system 10 is capable of generating a jitter out signal to transmit to a remote DTE or DCE to test the remote DTE or DCE jitter response. The jitter out signal is generated by routing a reference clock signal via line 242 to the dual frequency synchronous counter 244. Phase comparator 246, filter 248, and VCO 250 comprise a phase lock loop designed for injecting jitter onto the reference clock signal provided on line 242. The amount of jitter is controlled by the DSP 15 which provides a digital signal to D-A converter 216 which is converted to an analog injection signal by the D-A converter 216 and dual D-A 238. The analog injection signal is routed to the VCO 250 via filter 240. The output of the VCO 250 is the summation of the reference clock input on line 242 and the injected jitter signal. The output of VCO 250 is routed to PGA-4 164 and framer chip 156 or 158 where it is prepared for transmission via PGA-3 116 and the selected hardware interface.

The digital volt ohm meter 18 can receive inputs from either a pair of banana jacks 252 or can receive an input from either the primary or secondary T-1 connections across resistor 254. The banana jacks do not require a common ground with the rest of the system 10, since the DVOM transformer coupled power supply and optocoupler 36 provides isolation of the DVOM 18 from the rest of system 10. When a T-1 line input is connected to DVOM across resistor 254, the DVOM 18 is capable of measuring the T-1 simplex current.

Oscilloscope trigger circuitry 256 receives an input from dual A-D converter 238 via line 258. The input via line 258 is an operator selected trigger reference. The scope trigger circuit 256 also receives a sweep rate signal from the time base 260 of custom gate array 34 via input line 262. The oscilloscope is triggered at the selected reference level and sweep read by scope trigger circuit 256, with the analog sample provided to flash A-D converter 174 for digitizing and routing for processing and display.

The serial to parallel converter to 160 and parallel to serial converter 264 provide direct access between PGA-3 116 and DSP 64 without having to be routed through serial controller (SCC) 86. Serial signals presented by PGA-3 116 to the serial to parallel converter 160 are transmitted through mux 202 in parallel form to 160 for presentation to the DSP bus 70. Parallel data is routed from DSP 15 by the DSP bus 70 through buffer 206 and into FIFO 204. From FIFO 204, the parallel data is sent to parallel to serial converter 264 for presentation to the PGA-3 116.

DETAILED DESCRIPTION OF THE PROGRAMMABLE GATE ARRAYS

Figure 3:
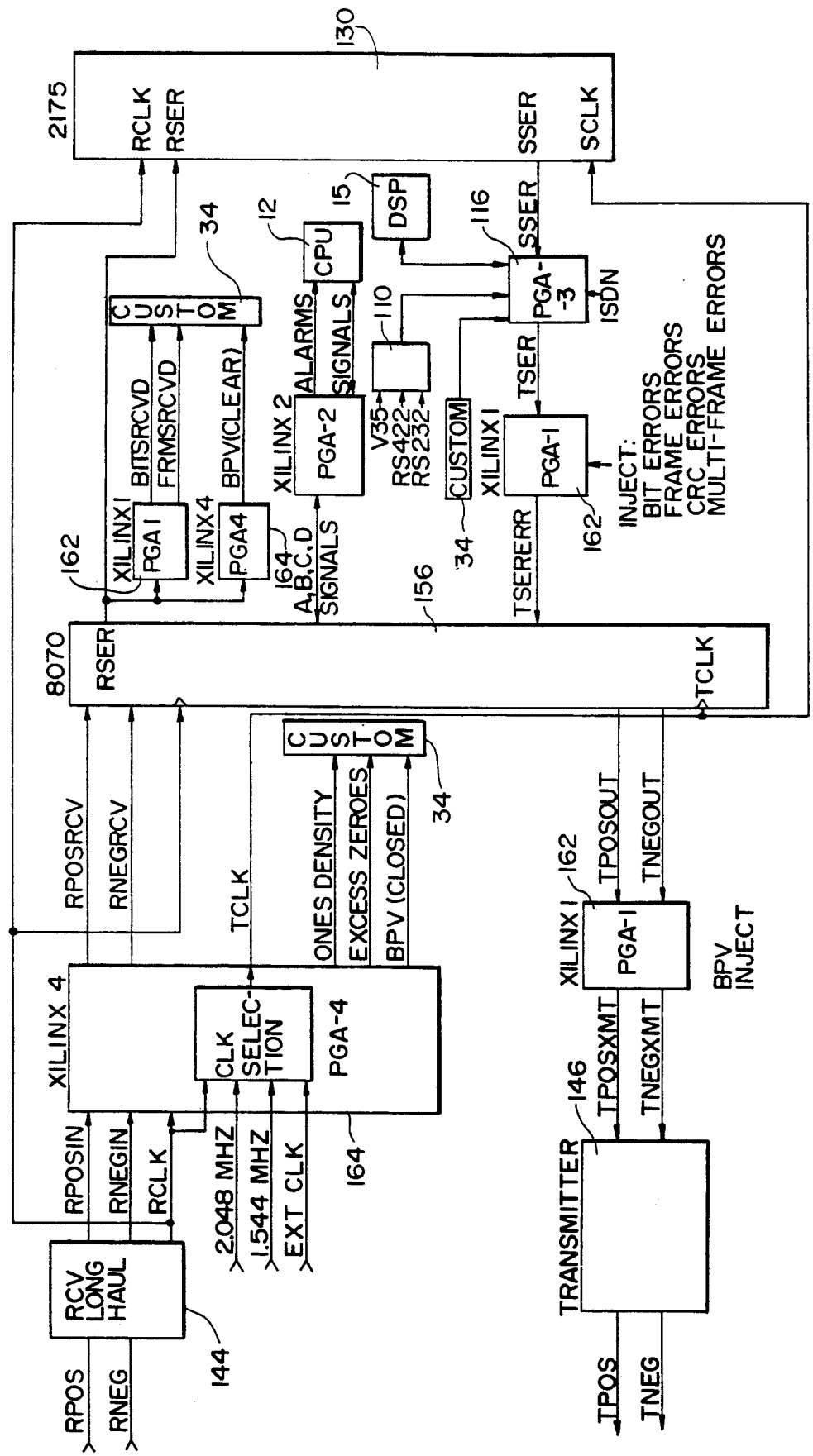
FIG. 3 is a block diagram depicting signal transmission between the gate arrays.
Figure 5A:
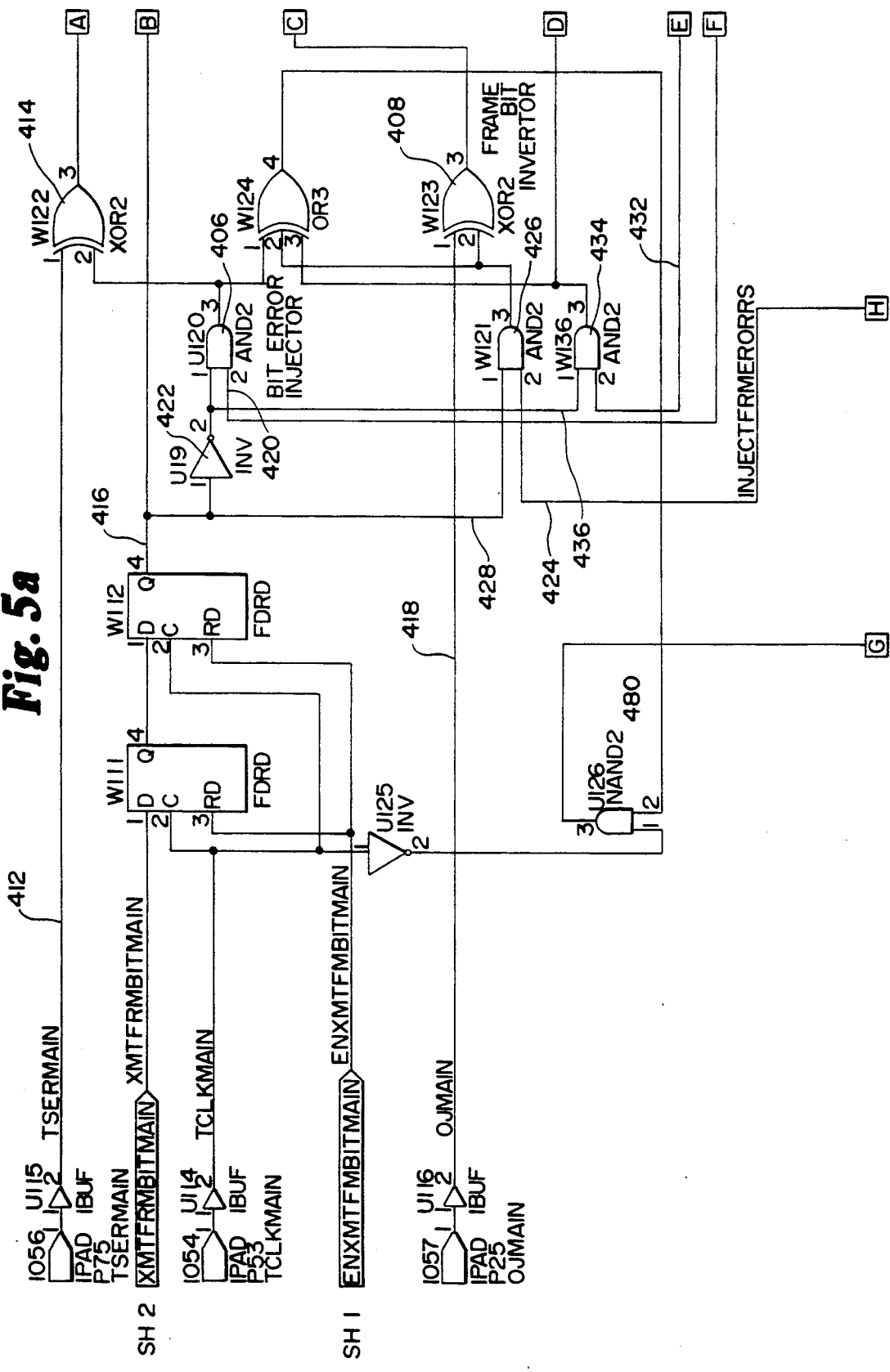
FIG. 5 is a logic diagram depicting in detail the inject selected errors capability of the present invention.
Figure 5B:
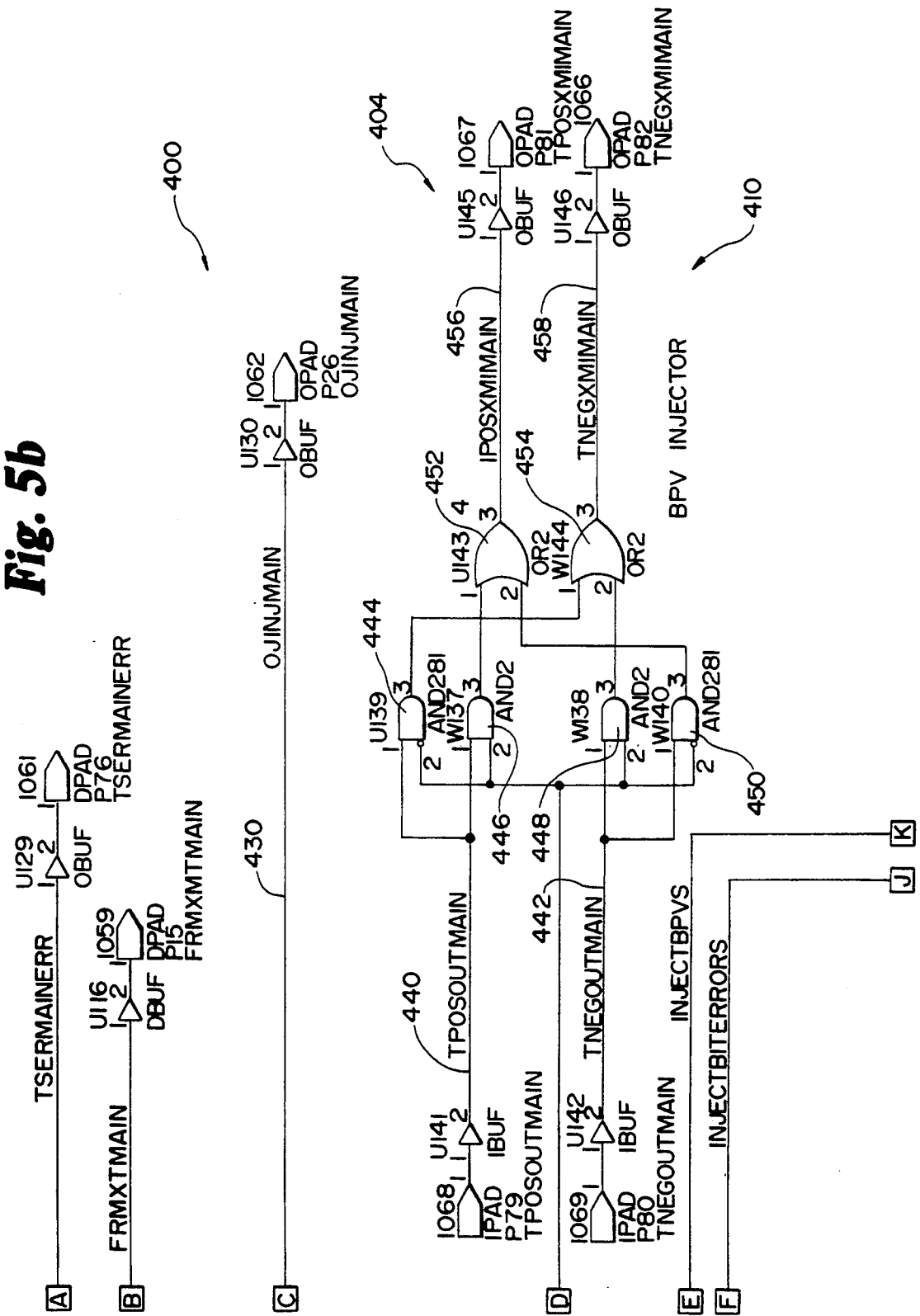
Figure 5C:
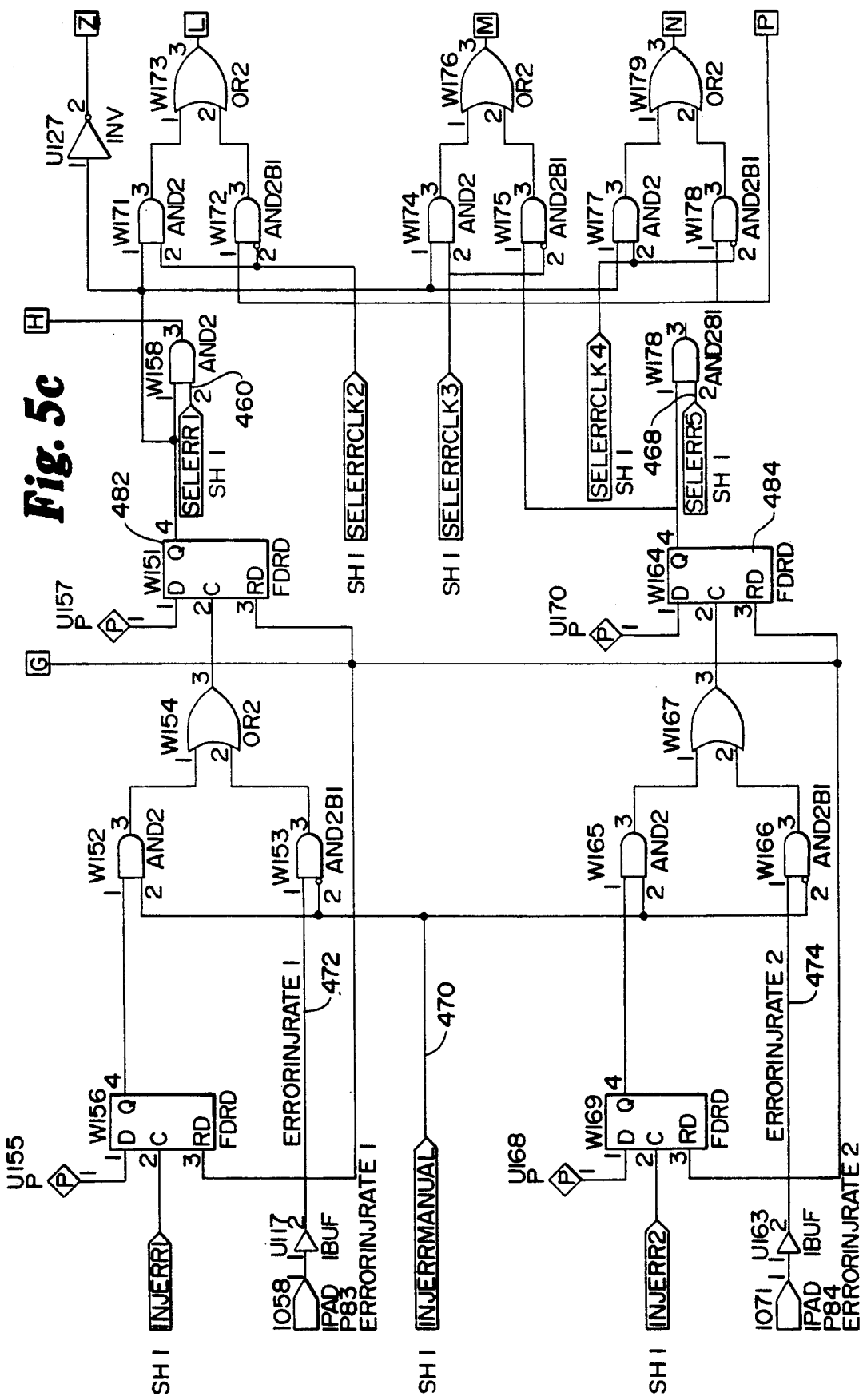
Figure 5D:
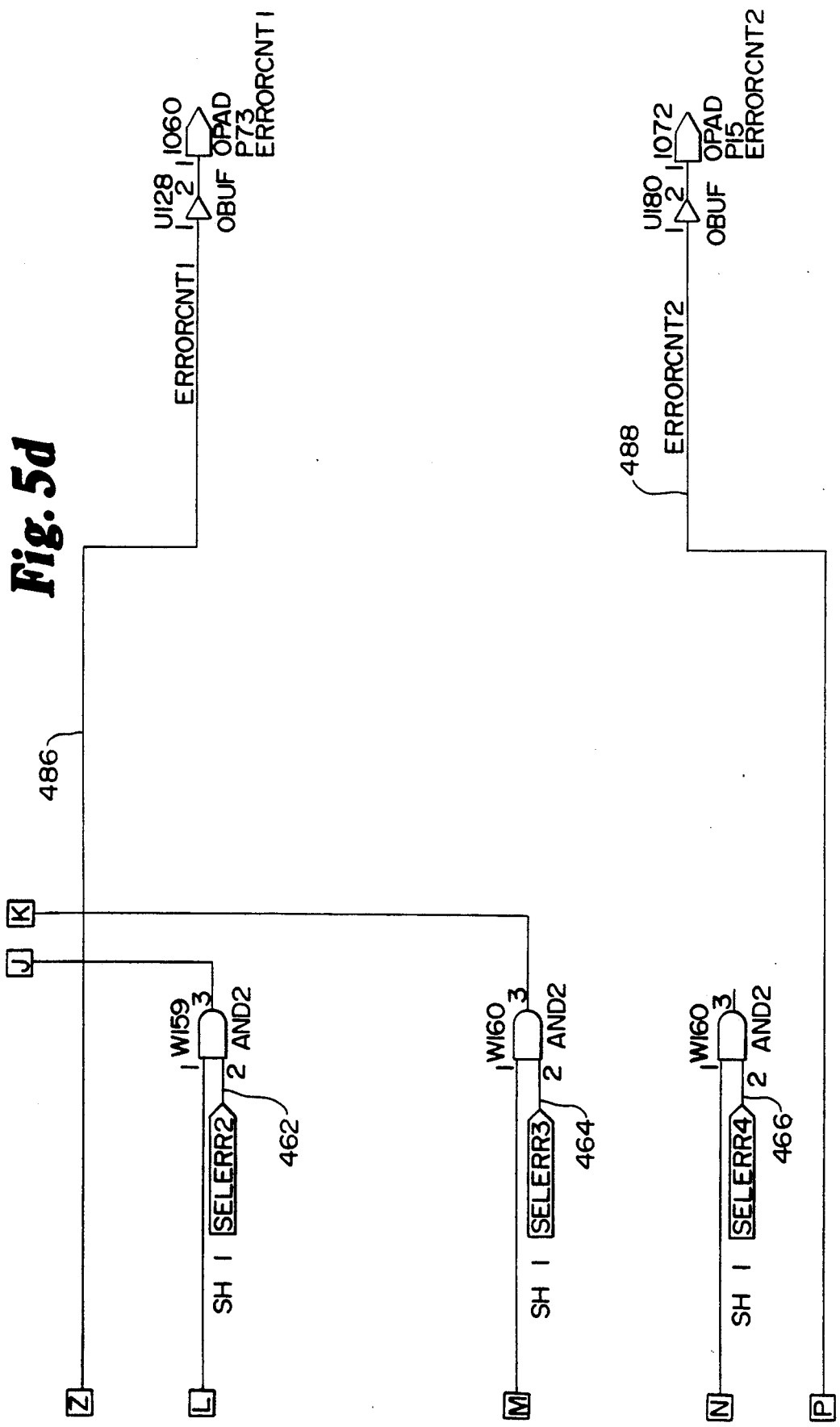

FIG. 3 depicts signal communication between the various programmable gate arrays. It will be understood that, for clarity of understanding the flow of signals, several of the elements (such as the programmable gate array 164, programmable gate array 162, custom gate array 34, and programmable gate array 162) are depicted in multiple positions on FIG. 3. It will be further understood that FIG. 3 depicts primary side T-1 signal handling. Signal handling for the secondary T-1 interface could include some or all of the signal handling and processing capabilities of the T-1 primary side.

T-1 signals received by the system 10 are presented to the clock and data recovery circuit 144 as a positive going signal RPOS and a negative going signal RNEG. The clock signal RCLK recovered by the clock and data recovery circuit 144 is presented to PGA-4 164, 8070 framer chip 156, and the elastic store buffer 130. The data recovered by circuit 144 is presented to PGA-4 as RPOSIN and RNEGIN signals which are transmitted to the 8070 framer chip 156 as RPOSRCV and RNEGRCV. The positive and negative going data signals are combined in the 8070 framer chip 156, and are transmitted to the elastic store buffer 130 as a single stream of data information RSER. From the elastic store buffer 130, the recovered data is routed to PGA-3 116 for distribution throughout system 10.

The clock portion of PGA-4 164 selects between the recovered clock RCLK, the onboard 2.048 megahertz clock 168, the onboard 1.544 megahertz clock 170, and an external clock that may be applied through BNC connector 166. The selected clock TCLK is transmitted from PGA-4 164 to the 8070 framer chip 156 and the elastic store buffer 130.

Counters within the custom gate array 34 are provided with data from PGA-4 64 indicating one's density (ONESDENSITY), excess zeros (EXCESSZEROS), and bipolar violations (BPV (CODED)) relating to the received T-1 signals RPOS and RNEG.

The received T-1 signal RSER is routed to PGA-1 162 where a count of the bits received (BITSRCVD) and the number of frames received (FRMSRCVD) are provided to counters within the custom gate array 34. The received T-1 signal RSER is also provided to PGA-4 164 for a determination of bipolar violations (BPV (CLEAR)) that is provided to counters within the custom gate array 34.

The 8070 framer chip extracts A, B, C, and D signalling information from the RPOSRCV and RNEGRCV signals. The A, B, C, D signals are presented to PGA-2 159 for processing and transmission of alarms information ALARMS to the CPA 12. It will also be noted from FIG. 3 that the CPU 12 is capable of generating signalling information which is transferred through PGA-2 to the 8070 framer chip 156.

T-1 signals to be transmitted by the system 10 are routed from PGA-3 116 to PGA-1 162 as TSER. Intentional errors in the serial data stream can injected into the serial data stream TSER by PGA-1. Injected errors may include bit errors, frame errors, CRC errors, and multiframe errors. The error injected serial data stream TSERERR is provided to the 8070 framer chip 156, where the signal is framed and synchronized for transmission, and is then provided to PGA-1 as a positive going TPOSOUT and negative going TNEGOUT T-1 signal. Bipolar violation errors may be injected onto the TPOSOUT and TNEGOUT signal within programmable gate array 1, and the signals are presented from programmable gate array one 162 to the transmitter 146 as TPOSXMIT and TNEGXMIT.

As described above, programmable gate array one (PGA-1) 162 is configured within system 10 to function primarily as a T-1 channel select module and is also used as an error injection module for inserting predetermined errors into a bit stream. FIGS. 4 and 5 depict in detail the logic within PGA-1 that accomplishes T-1 channel selection and the injection of errors.

The T-1 channel select logic of PGA-1 is depicted in detail FIG. 4. While the logic will be described in terms of selecting a primary T-1 channel to be received by the system 10, it will be understood that identical logic is employed for selected a received secondary channel, as well as selecting both primary and secondary transmit channels.

Framer chip 156 continuously monitors the primary T-1 channel received on either DB15 jack 138, RJ45 jack 140 or bantam jack 142. The 8070 framer chip 156 is connected to PGA-1 62 by five receive channel lines that indicate to PGA-1 which of the 24 T-1 channels (or which of the 32 two meg. channels) are currently being monitored by the 8070 framer chip. The five lines are annotated in FIG. 3 as lines 302, 304, 306, 308, and 310. It will be understood that the channel being monitored by the 8070 framer chip 156 is continuously changing, since the channels on a T-1 line are time division multiplexed. Each of the five lines from the 8070 framer chip 156 are input to respective exclusive nor gates 312, 314, 316, 318, 320.

The second input line to each of the exclusive nor gates 312, 314, 316, 318, 320 are preprogrammed for a selected one of the 24 T-1 channels (or one of the 32 2 meg. channels) to be received and processed by the system 10. In particular, input lines 322, 324, 326, 328, 330 to respective exclusive nor gates 312, 314, 316, 318, 320 are enabled with binary signal levels that together represent a selected channel. When the channel currently being monitored by the 156 matches the preselected channel, a receive channel main enable (RCVCHANMAINEN) signal is presented at the output of nand gate 332. The RCVCHANMAINEN signal is provided to PGA-3 116 which then routes the data on the selected channel through serial controller chip 86, or through serial to parallel converter 160, to the DSP 15 for processing.

The select channel circuitry 300 also includes or gate 334 and nor gate 336 which together monitor each of the input lines from the 8070 framer chip 156 to provide an output signal indicating the presence of the frame bit in the 193 bit T-1 bit stream. The output signal from nand gate 336 indicating the presence of framing bits is routed to PGA-3 116 for distribution within system 10.

Programmable gate array one (PGA-1) 162 is also used within system 10 to inject errors into a transmitted bit stream for testing of line conditions, and of DCE and DTE performance, under error conditions. FIG. 4 provides a detailed presentation of the inject error logic of PGA-1 162.

The inject error logic 400 includes error selection logic 402 and error injection logic 404. The error injection logic 404 includes bit error injector 406, frame bit inverter 408, and bipolar violation (BPV) injector 410.

The error injection logic 404 is provided with a stream of serial data, properly framed by the 8070 framer chip 156 for transmission on a T-1 line. The serial data from the 8070 framer chip is annotated TSERMAIN on line 412, and is input into exclusive or gate 414. The error injection logic 400 is also provided with an input designating the presence of the frame bit (annotated XMTFRMBITMAIN) on line 416 to enable the error injection circuitry to distinguish between frame bits and data bits. The framing bits are presented to the frame bit converter 408 via line 418.

When line 420 to the bit error injector 406 is provided with an INJECTBITERRORS signal, the output of the bit error injector 406 will inject bit errors through exclusive or gate 414 into the T-1 data stream present on line 412. The resulting output of the exclusive or gate 414 is looped back to the 8070 framer chip 156 for transmission of the predetermined error signal. Inverter 422 ensures that the bit error injector 406 is active only when data bits, and not framing bits, are being presented to exclusive or gate 414. The data signal with predetermined errors injected into it is transmitted by the system 10 to test DTE, DCE, or line performance under error conditions.

When line 424 to and gate 426 is provided with an INJECTFRAMEERRORS signal, and the presence of a frame bit is indicated on line 428 to and gate 426, the exclusive or gate 408 of the frame bit invertor is activated to invert the frame bit. The resulting inverted frame bit output of inverter 408 is rerouted to the 8070 framer chip 156 via line 430, and a serial data transmission with a known framing error can be sent by system 10.

When line 432 to and gate 434 is provided with an INJECTBPV signal, and the input on line 436 to and gate 434 indicates that a frame bit is not present, the BPV injector 410 is enabled by the output of and gate 434 on line 438. The BVP injector 410 also receives inputs on line 440 and 442 indicating the presence of a positive going pulse on line 440 and a negative going pulse on 442. The four and gates 444, 446, 448, 450, and two or gates 452, 454, convert the positive input signals to negative and the negative input signals to positive and present the inverted signals on output lines 456 and 458 on bipolar violation errors.

Referring to the error selection circuitry 402 depicted in the lower half of FIG. 4, up to five errors can be preselected for injection into the transmitted data stream by enabling the SELERR one, SELERR two, SELERR three, SELERR four, or SELERR five outputs on leads 460, 462, 464, 466, 468, respectively. While only three of the select errors, as described above, are programmed in FIG. 4 (inject frame errors, inject bit errors, and inject bipolar violation errors), the remaining SELERR inputs could be used for injecting errors such as TRC errors or multiframe errors. The selected errors can be either manually injected by providing an enable signal on line 470, can be clocked in at one of two preselected periodic rates by providing an error inject rate clock on lines 472. And gate 480 and flip flops 42, 44 provide a count on output lines 486 and 488 of the errors injected into the data stream.

The programmable gate arrays provide the testing device 10 with the versatility to handle any of a number of operating protocols or data formats while maintaining the compact size of the device 10. Each of the programmable gate arrays can be reprogrammed to accommodate any of the protocols available through the hardware interfaces of the device 10, by the device user, simply by designating through the keypad interface 22 which protocol is to be used. The programmable gate arrays are then configured to accommodate the selected protocol or data format with the parameters entered into the device 10 through the disk drive 23 and stored in the DRAM 40.

Display Backlight Converter

Figure 6:
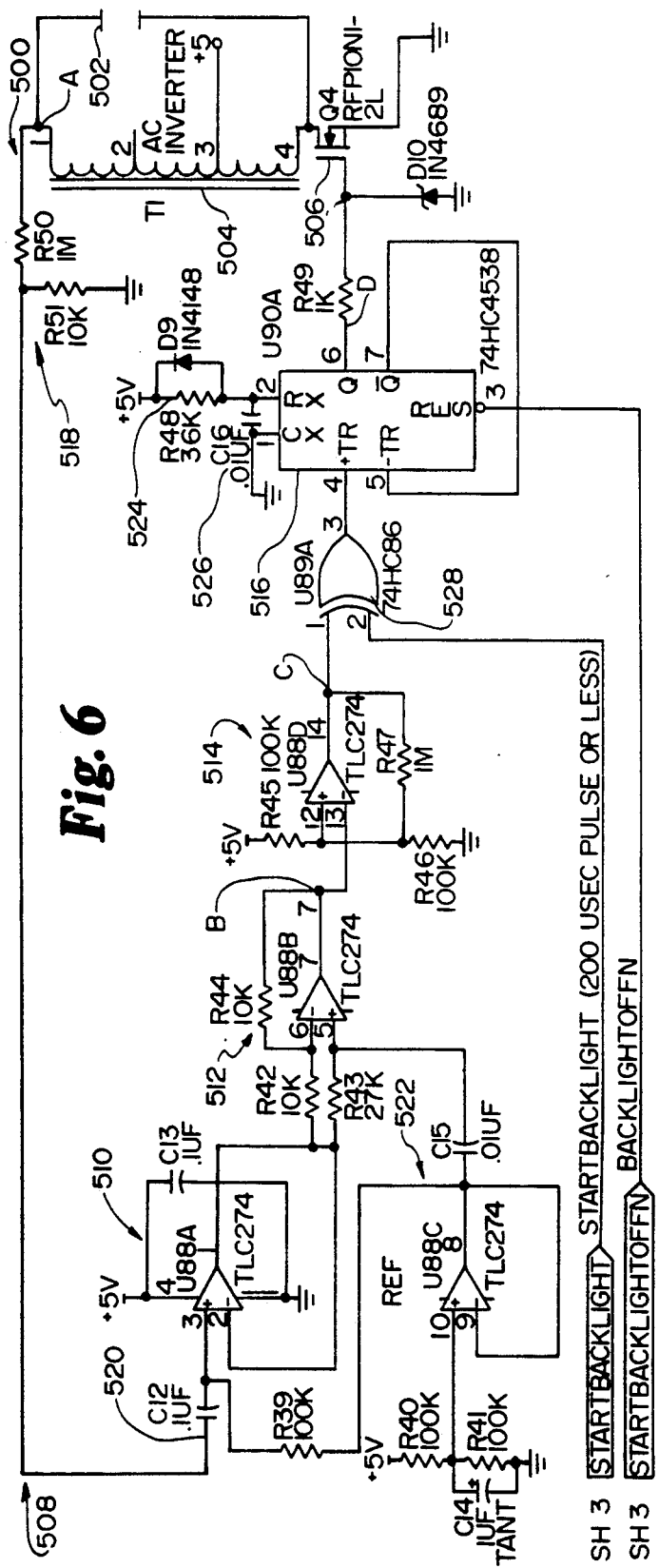
FIG. 6 is a schematic diagram of the power efficient circuitry for providing the LCD output display of the present invention with a backlight.

As described in detail above, the display 16 is an LCD display provided with a backlight capability for viewing in reduced light conditions. The backlight inverter 58 includes unique driving circuitry 500, depicted in FIG. 6, for efficiently powering the backlight with low power consumption.

The backlight inverter 58 in accordance with the present invention broadly includes driving circuitry 500, capacitor 502, AC converter transformer 504, N-channel FET driving transistor 506, and peak level detection circuitry 508 for detecting the peak power value generated at terminal 1 of transformer 504. The peak level detection circuitry 508 broadly includes buffer amplifier 510, 90° phase shifter 512, Schmidt trigger 514, and one short multivibrator 516.

Electro-luminescent capacitor 502, having capacitor plates that extend across the back portion of the display panel 16, provides the light energy for the display backlight. The capacitor 502 generates light when it is driven by a 115 volts peak, 500 hertz signal. While the ability to provide backlight to a LCD display by driving an electro-luminescent capacitor is known, the large size of the 640 by 200 pixel, 25 by 80 column, display 16, and therefore the large physical size of capacitor 502, used in the system 10, presents serious power consumption problems. As those skilled in the art will appreciate, power requirements to the capacitor 502 increase by a power of two in relationship to an increase in the size of the capacitor 502. The driving circuitry 500 is able to power the large capacitor 502, within the power requirements of a portable, battery powered system, by unique circuitry that operates at approximately 75% efficiency as opposed to the approximately 50% efficiency of conventional backlight drivers.

Capacitor 502 and transformer 504 comprise an oscillating tank circuit, driven by transistor 506. FIG. 6A depicts the waveform of the tank circuit at point A. Note that at time t1, the driving transistor 506 is turned on, thereby boosting the diminishing tank circuit output. Voltage divider 518 reduces the approximately 230 volt peak to peak signal at point A to an approximately 1 volt peak to peak signal. The coupling capacitor 520 presents the reduced output signal of the tank circuit to buffer amplifier 510. Ground reference circuit 522 provides a grounding reference to buffer amp 510.

The output of buffer amp 510 is presented to the 90° phase shifter 512. The phase shifter 512 shifts the signal in phase, as is shown by a comparison of FIGS. 6A and 6B depicting the waveform at point A and point B in the circuit. The primary function of the phase shifter 90 is to ensure that the driving transistor 506 is turned on so as to drive the tank circuit of capacitor 502 and transformer 504 when the voltage across the tank circuit is at its peak. The 90° phase shift is introduced so that the peak voltage within the tank circuit at point A can be related to the more easily and precisely detected zero crossing of the waveform at point B.

Figure 6C:
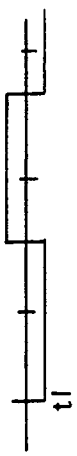
FIGS. 6A-6D depict the waveform at designated points of the circuit depicted in FIG. 6.
Figure 6D:
Figure 6B:
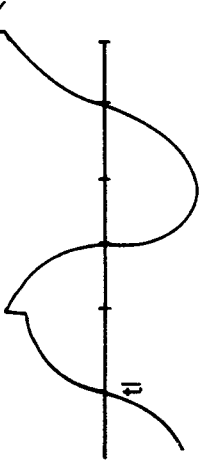
Figure 6A:
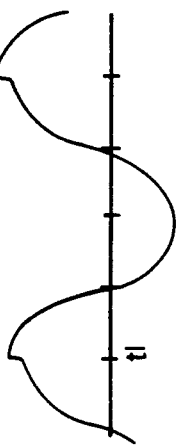

The output of the phase shifter 512 is provided to Schmidt trigger 514 where the waveform of FIG. 6B is squared up into the waveform of FIG. 6C. One shot multivibrator 516 is used to adjust the pulse duration of the squared up waveform presented by the Schmidt trigger 514. The pulse width of the output signal of one shot multivibrator 116 is set by the RC constant of resistor 524 and capacitor 526 to present the waveform depicted in FIG. 6D. The backlight inverter 58 is actuated by providing a STARTBACKLIGHT pulse provided to exclusive or gate 528, and is turned off by pulsing the reset port of one shot 516.

The driving circuitry 500 is capable of powering a large 25 by 80 column display electro-luminescent display with low power requirements because the electro-luminescent capacitor is driven precisely at the peak of the tank circuit waveform.

Description of the Instrument Carrying Case

The unique circuitry of the network testing device 10 allows for packaging of the powerful and versatile testing device 10 into a hand held, independently powered instrument case 600. The case 600 is depicted in FIG. 7, and broadly includes case body 602 having hand graspable carrying handle 604, and display panel 606 pivotally coupled to the case body 602 by right and left hinge assemblies 608, 610.

The key pad assembly 22 is carried on the upper surface 612 of the case body 602. Disk drive 23 is accessible through the right sidewall 614 of the case body 602. A latch receiving cavity 616 is located in the forward right portion of the case body upper surface 612, and a latch releasing trigger assembly 618 is located on the right side of handle 604.

The display panel 606 includes the 640 by 200 pixel LCD display screen 16 carried by support frame 620. Latch 622, receivable within cavity 616, projects outwardly from the right side of the support frame 620.

Trigger assembly 618 is depicted in detail in FIG. 8. The trigger assembly 618 includes finger operated slide button 624, pivot hook 626, and wire link 628.

Slide button 624 is slideably received within channel 630 of handle 604. One end 633 of the wire link 628 is fixedly retained within a recess 632 on the underside of slide button 624. The opposite end 634 of the wire link 628 engages the lower end of the pivot hook 626.

Pivot hook 626 is pivotally mounted about pivot point 636 within the case body 602. The upper end of hook 626 includes latch engaging head 638. The hook 626 is biased into a forward, latch engaging position by biasing spring 640. As can be seen in FIG. 8, latch 622 is receivable within the cavity 616 for engagement by the latch head 638 so as to retain the display panel 606 in a closed position.

The trigger assembly 618 includes spring loaded plunger 642. When the slide button 624 is shifted rightwardly, as viewed in FIG. 8, wire link 628 pivots the hook 636 against the biasing force of spring 640. The head 638 of hook 626 is thereby urged leftwardly, as viewed in FIG. 8, releasing the latch 622. Spring loaded plunger 642 abuts against the latch 622 to urge the display panel 606 upwardly out of its closed position.

Figure 9:
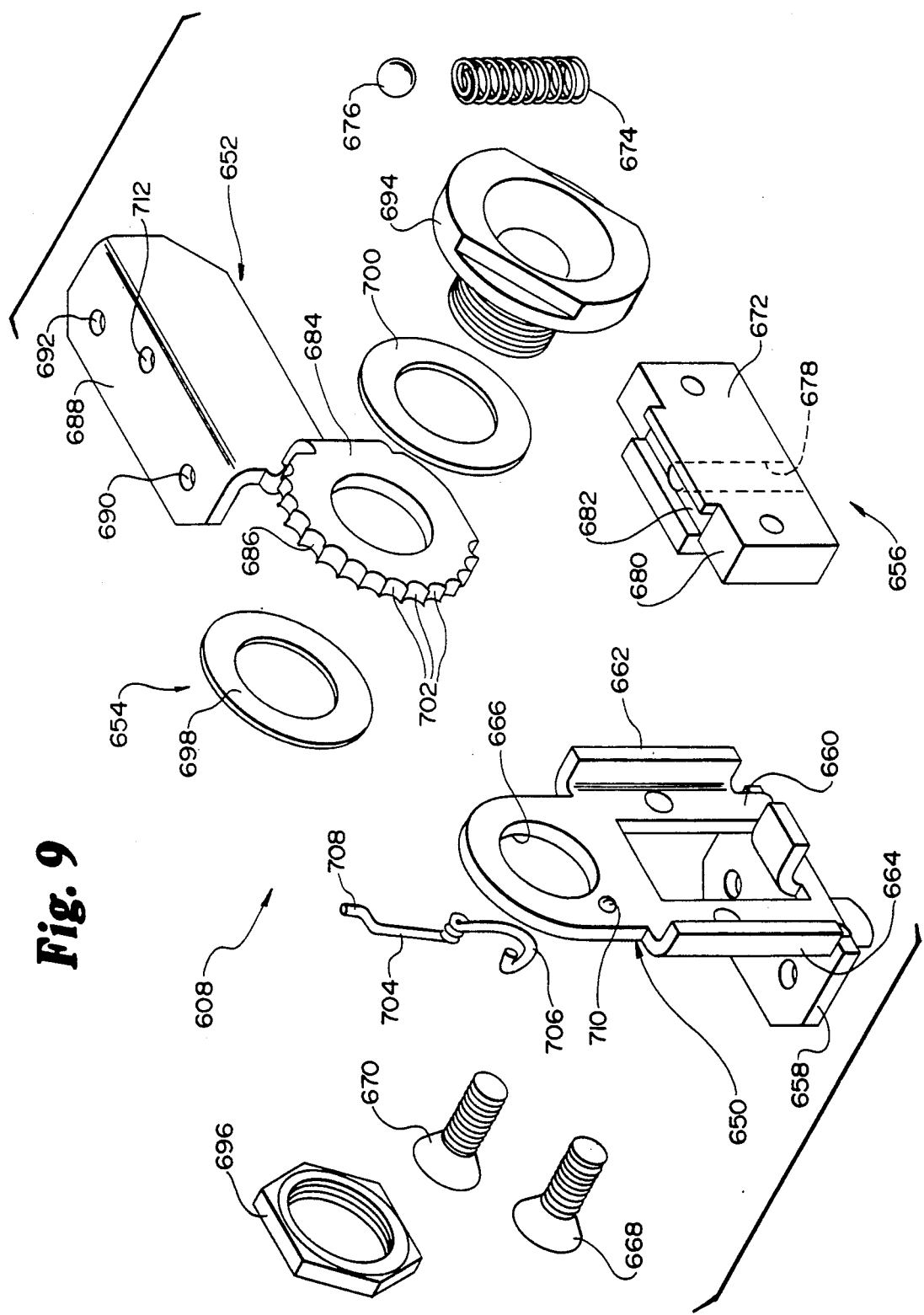
FIG. 9 is an exploded view of the hinge assembly for coupling the display to the body of the instrument case.

The right hinge assembly 608 is depicted in detail in FIG. 9, it being understood that the left hinge assembly 610 is a mirror image of the right hinge assembly 608. The hinge assembly 608 broadly includes upright stanchion 650, display panel supporting bracket 652, coupling assembly 654, and retaining assembly 656.

Upright stanchion 650 is fixedly retained within the case body 602 by screws (not shown) received through base plate 658. The stanchion 650 includes upstanding member 660 having retaining assembly engaging side arms 662, 664 and coupling assembly receiving aperture 666. The retaining assembly 656 is fixedly attached to the upright member 660 by screws 668, 670.

Retaining assembly 656 includes assembly body 672, biasing spring 674, and bracket engaging ball bearing 676. The biasing springs and ball bearings 676 are received within an upright, generally cylindrical channel 678 of body 672. The upper surface 680 of body 672 includes bracket receiving groove 682. The upright channel 678 is in communication with the groove 682 such that the ball bearing 676 extends upwardly into the groove 682 through aperture 683. The diameter of the aperture is smaller than the diameter of ball bearing 676, such that the ball bearing 676 remains within the right channel 678 notwithstanding the fact that a portion of the ball bearing 676 extends through aperture 666 into the groove 682.

Bracket 652 includes a base ring 684 having a scalloped outer periphery 686, and display panel engaging member 688. The display panel 606 is attached to the member 688 by screws (not shown) received through apertures 690, 692.

Coupling assembly 654 includes threaded pivot member 694, retaining nut 696, and washers 698, 700. The pivot member 694 is received through base ring 686 of bracket 652 and the aperture 666 of upright stanchion 650.

The base ring 684 of bracket 652 is received within groove 682 of the body 672 of retaining assembly 656. The ball bearing 676 is receivable within the individual cutouts 702 of the scalloped periphery 686 of the base ring 684. Biasing spring 674 urges the ball bearing 676 into the cutouts 702, thereby retaining the bracket 652 (and therefore the display panel 608) at a desired display angle.

A tension spring 704 having a first end 706 attached to the upright stanchion 650, and a second end 708 attached to the bracket 652, provides additional support to the bracket 652 when it is in the display position. The lower end 706 of tension spring 704 is received through aperture 710 of stanchion 650. The upper end 708 is retained within aperture 712 of bracket 652.

We claim:

1. A communications network testing device for testing operating characteristics of a variety of communications networks, comprising:

a plurality of coupling means, each of which is adapted for operable coupling of said testing device to one or more of said variety of communications networks, said networks having different operating protocols;

processing means for processing communications signals communicated between said testing device and said communications networks; and interface means for interfacing signals between said processing means and at least a selected one of said variety of communication networks, said interface means including reprogrammable logic means whereby said interface means can be selectively reprogrammed to interface communications with said variety of communications networks having different operating protocols.

2. The invention as claimed in claim 1, said processing means including means for processing analog and digital communications signals.

* * * * *